(No Model.)

J. P. RADLEY.
BARLEY FORK.

No. 423,573. Patented Mar. 18, 1890.

WITNESSES:
Walter E. Ward
John N. Mayor

INVENTOR
John P. Radley
BY
Frederick W. Cameron
ATTORNEY.

UNITED STATES PATENT OFFICE.

JOHN P. RADLEY, OF ALBANY, NEW YORK.

BARLEY-FORK.

SPECIFICATION forming part of Letters Patent No. 423,573, dated March 18, 1890.

Application filed November 8, 1889. Serial No. 329,689. (No model.)

*To all whom it may concern:*

Be it known that I, JOHN P. RADLEY, a citizen of the United States, residing in the city and county of Albany, and State of New York, have invented a new and useful Improvement in Barley-Forks, of which the following is a specification.

My invention relates to improvements in apparatus for handling barley and other grain; and the object of my invention is to provide a light and durable fork having spring-tines with blunt ends. I accomplish this object by means of the mechanism illustrated in the accompanying drawings, in which—

Figure 1:
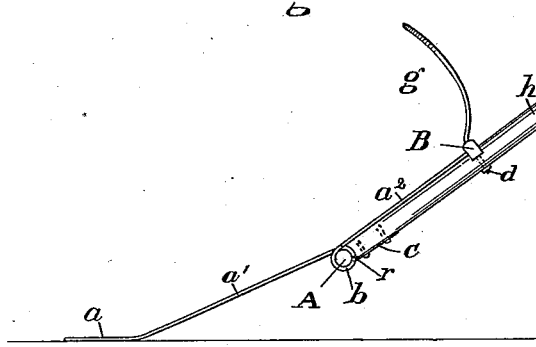
Figure 2:
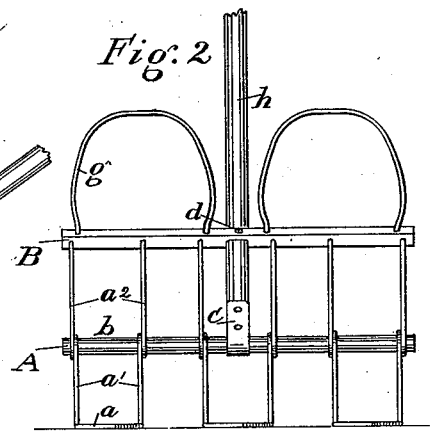
Figure 3:
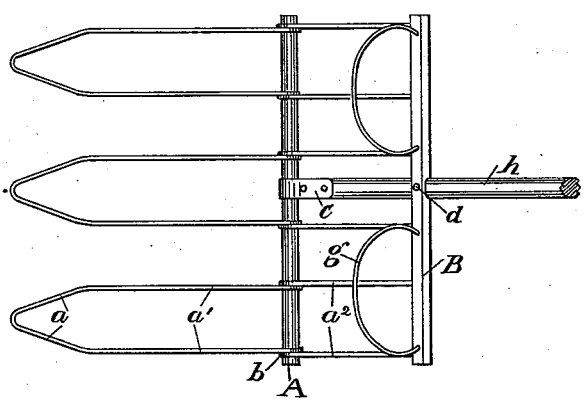
Figure 4:
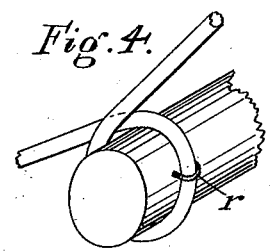

Figure 1 is a side elevation; Fig. 2, a rear elevation; Fig. 3, a plan of my invention; and Fig. 4, a detail view, showing the manner of attaching the tines to the rod A.

Similar letters refer to similar parts throughout the several views.

Barley-forks are usually provided with a series of long wooden tines or long steel tines, and have at the rear of the tines bow-shaped strips extending a short distance above the head of the fork.

In order to give a wooden tine the desired curve, it is necessary to subject it to a steaming process. Wooden tines thus formed, when exposed to inclement weather, are very quickly rendered quite useless, because they straighten out and lose their curve after becoming wet and then dried. Wooden tines are easily broken. The point of a tine catches into the ground and is easily broken off. Steel tines are also easily broken, and are extremely dangerous, because of the liability which threatens the loader of being struck with the sharp point of one of these heavy forks. I obviate these objections and provide a fork with tines which are unaffected by the weather, which cannot be broken, and which have blunt points, rendering them entirely harmless.

A short distance from the end of the handle $h$, I attach by nut and bolt $d$, or in any suitable manner, the cross-bar B. Into the upper surface of the cross-bar B, I place the wires $g$ in the form of a bow, and provide a series of two or more bows thereon, forming a rest against which the grain presses in the use of the fork, preventing it from falling out of the fork toward the handle. At the end of the handle $h$, I attach the rod A, extending parallel to the cross-bar B, secured to the handle $h$ by means of the strap C or in any suitable manner. In the side of the cross-bar B nearest the rod A, I insert the end of the spring-wire $a^2$, coil the wire $a^2$ about the rod A, and then extend the wire a short distance, determined by the required length of the tine, designated in the drawings by $a'$, and then bend the wire upwardly, forming the foot $a$. I then bend the wire back toward the cross-bar, forming a loop at the toe of the foot $a$, coil it about the rod A, and attach it to the cross-bar B, thus forming a tine having two sides a short distance apart, parallel the one to the other, or very nearly so, and having a blunt point. The sides of the tines being so close to each other makes an extremely fine-tined fork, very useful when the straw is short. The foot $a$ sliding along the ground, having its sides so close together, enables the operator to take up the straw very easily and cleanly and without penetrating the earth with the end of the tines, as often occurs in the use of the ordinary fork. The tines, being formed of one piece of wire or steel supported by the rod A and secured to the bar B, having two sides a short distance from each other, may be made of a material much finer and lighter than could be used for a tine as ordinarily constructed, and causing less expense. They are unbreakable and will not be affected by the weather, as wooden tines would be.

An important part of my invention is the coiling of the wire about the rod A, forming not only a support for the tine, but also acting as a spring, which assists the operator in the use of the fork. When the fork is loaded, the weight on the tines presses them down, and when the fork is to be unloaded or partly turned over the resiliency of the tines assists in throwing the grain out of the fork. However, I do not limit myself to this method of securing the tine to the rod A.

What I claim as my invention, and desire to secure by Letters Patent, is—

In a barley-fork, the combination of a tine constructed of a single piece of metal bent at about midway between its ends, forming two sides substantially parallel and a short distance apart, near its bent end *a* slightly curved upwardly, the remaining portion of the tine being parallel to the handle *h* and attached thereto by being looped about the rod A, attached to the end of the handle *h* and having its ends secured to the cross-bar B, attached to the handle just above said rod, with a bow-shaped piece of metal secured to the top of the cross-bar B and extending slightly above it at right angles to said tine, all substantially as described, and for the purpose set forth.

JOHN P. RADLEY.

Witnesses:
FREDERICK W. CAMERON,
WALTER E. WARD.